(12) United States Patent
Hiltch (10) Patent No.: US 11,194,844 B1
(45) Date of Patent: Dec. 7, 2021

(54) SYSTEM AND METHOD FOR DETECTING SECOND DEGREE RELATIONSHIPS BETWEEN ENTITIES BY UNIQUELY RESOLVING ENTITIES

(71) Applicant: Skyline Al Ltd., Tel Aviv-Jaffa (IL)

(72) Inventor: Or Hiltch, Rishon LeZion (IL)

(73) Assignee: Skyline Al Ltd., Tel Aviv-Jaffa (IL)

( * ) Notice: Subject to any disclaimer, the term of this patent is extended or adjusted under 35 U.S.C. 154(b) by 0 days.

(21) Appl. No.: 17/071,259

(22) Filed: Oct. 15, 2020

Related U.S. Application Data (60) Provisional application No. 63/073,196, filed on Sep. 1, 2020.

(51) Int. Cl.
    *G06F 16/28* (2019.01)
    *G06F 16/215* (2019.01)

(52) U.S. Cl.
    CPC .......... *G06F 16/288* (2019.01); *G06F 16/215* (2019.01)

(58) Field of Classification Search
    USPC ....................................................... 707/692
    See application file for complete search history.

(56) References Cited

U.S. PATENT DOCUMENTS

| | | | | |
|---|---|---|---|---|
| 5,500,793 A * | 3/1996 | Deming, Jr. | ........... | G06Q 40/04 705/37 |
| 7,076,452 B2 | 7/2006 | Florance et al. | | |
| 7,254,559 B2 | 8/2007 | Florance et al. | | |
| 7,333,943 B1 * | 2/2008 | Charuk | ................... | G06Q 10/10 705/26.1 |
| 7,640,204 B2 | 12/2009 | Florance et al. | | |
| 8,140,442 B2 * | 3/2012 | Heyer | ..................... | G06Q 30/08 705/313 |
| 8,566,172 B2 * | 10/2013 | Polston | ................... | G06Q 50/16 705/26.1 |
| 9,424,861 B2 * | 8/2016 | Jerram | ................... | G06Q 30/02 |
| 10,019,767 B2 * | 7/2018 | Dickson | ................ | G06F 16/951 |
| 2003/0135512 A1 * | 7/2003 | Morgan, Jr. | ........ | G06F 16/9558 |
| 2003/0229592 A1 | 12/2003 | Florance et al. | | |
| 2006/0190279 A1 * | 8/2006 | Heflin | ..................... | G06Q 30/00 705/307 |
| 2009/0132316 A1 * | 5/2009 | Florance | ................ | G06Q 30/06 701/532 |
| 2009/0172035 A1 * | 7/2009 | Lessing | .................. | G06Q 30/02 |

(Continued)

*Primary Examiner* — Cam Linh T Nguyen
(74) *Attorney, Agent, or Firm* — M&B IP Analysts, LLC (57) ABSTRACT

A system and method for identifying second degree connections between entities represented in different databases. The method includes: identifying a second participating entity that owns a subject entity, wherein identifying the second participating entity further comprises resolving the subject entity between a first database and a second database, wherein the subject entity is resolved such that respective instances of the subject entity in the first database and the second database are determined as each uniquely identifying the same subject entity, wherein resolving an entity further comprises applying resolution rules requiring at least matching a plurality of features between respective instances of the entity; determining a second degree connection between a first participating entity and the second participating entity, wherein the second degree connection includes a linking entity that is connected to each of the first participating entity and the second participating entity in at least one third database.

19 Claims, 5 Drawing Sheets

(56) References Cited

U.S. PATENT DOCUMENTS

| | | | |
|---|---|---|---|
| 2009/0182679 A1* | 7/2009 | Harrington | G06Q 50/188 705/80 |
| 2009/0271348 A1 | 10/2009 | Allen et al. | |
| 2011/0093353 A1* | 4/2011 | Nutter | G06Q 30/0605 705/26.2 |
| 2013/0304657 A1 | 11/2013 | Miller et al. | |
| 2014/0279386 A1* | 9/2014 | Meyer | G06Q 50/16 705/38 |
| 2014/0279400 A1* | 9/2014 | Allnutt | G06Q 40/025 705/38 |
| 2015/0199766 A1* | 7/2015 | Vilmont | G06Q 50/16 705/36 T |
| 2016/0048934 A1* | 2/2016 | Gross | G06K 9/4642 705/313 |
| 2016/0086294 A1* | 3/2016 | Khamis | G06Q 40/025 705/38 |
| 2016/0292800 A1* | 10/2016 | Smith | G06Q 50/16 |
| 2018/0225577 A1 | 8/2018 | Krauss | |
| 2018/0285957 A1 | 10/2018 | Ng et al. | |
| 2020/0286194 A1* | 9/2020 | Li | G06Q 40/12 |

\* cited by examiner

SYSTEM AND METHOD FOR DETECTING SECOND DEGREE RELATIONSHIPS BETWEEN ENTITIES BY UNIQUELY RESOLVING ENTITIES

CROSS-REFERENCE TO RELATED APPLICATIONS

This application claims the benefit of U.S. Provisional Application No. 63/073,196 filed on Sep. 1, 2020, the contents of which are hereby incorporated by reference.

TECHNICAL FIELD

The present disclosure relates generally to detecting second degree relationships among entities in different types of databases, and more particularly to resolving entities in order to accurately detect such second degree relationships.

BACKGROUND

Databases frequently store the same, similar, or otherwise related information as data in different formats. This is particularly true when different databases are maintained by different companies. As a result of these differences, relationships between entities indicated in such data may not be identified through simply analyzing the data. This is particularly true when entities are not directly related such that the data directly indicates the relationship between them. Regardless, due to the dissimilarities caused by data being in different formats or otherwise being created by sources which may designate the same entities differently, entities may not be accurately represented and this representation affects identification of connections between them.

Although technological advances have been introduced in most industrial areas to improve efficiency and productivity, the real-estate domain currently requires a massive use of manual labor to perform tedious and costly steps. For example, when a potential buyer is interested in a certain real estate property (REP) and wants to contact the owner, it may be a burdensome task to contact the owner especially in case the REP is not yet listed or not for sale.

In most cases, having a direct connection (first-degree connection) to the REP owner, or to someone that is close enough to the owner, may provide the potential buyer with a great advantage in promoting a deal for buying the REP. However, such first-degree connections (or direct connections) to owners of REPs are not very common and therefore non-obvious connections should be detected in order to approach the REP owner through someone the owner knows. Although it may be difficult to detect non-obvious connections, identifying such non-obvious connections with the REP owner may increase the possibility that the owner would be receptive to receive an offer and promote a deal even when the REP is not for sale.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for identifying second degree connections between entities represented in different databases. The method comprises: identifying a second participating entity that owns a subject entity, wherein identifying the second participating entity further comprises resolving the subject entity between a first database and a second database, wherein the subject entity is resolved such that respective instances of the subject entity in the first database and the second database are determined as each uniquely identifying the same subject entity, wherein resolving an entity further comprises applying resolution rules requiring at least matching a plurality of features between respective instances of the entity; determining a second degree connection between a first participating entity and the second participating entity, wherein the second degree connection includes a linking entity that is connected to each of the first participating entity and the second participating entity in at least one third database.

Certain embodiments disclosed herein also include a non-transitory computer readable medium having stored thereon causing a processing circuitry to execute a process, the process comprising: identifying a second participating entity that owns a subject entity, wherein identifying the second participating entity further comprises resolving the subject entity between a first database and a second database, wherein the subject entity is resolved such that respective instances of the subject entity in the first database and the second database are determined as each uniquely identifying the same subject entity, wherein resolving an entity further comprises applying resolution rules requiring at least matching a plurality of features between respective instances of the entity; determining a second degree connection between a first participating entity and the second participating entity, wherein the second degree connection includes a linking entity that is connected to each of the first participating entity and the second participating entity in at least one third database.

Certain embodiments disclosed herein also include a system for identifying second degree connections between entities represented in different databases. The system comprises: a processing circuitry; and a memory, the memory containing instructions that, when executed by the processing circuitry, configure the system to: identify a second participating entity that owns a subject entity, wherein identifying the second participating entity further comprises resolving the subject entity between a first database and a second database, wherein the subject entity is resolved such that respective instances of the subject entity in the first database and the second database are determined as each uniquely identifying the same subject entity, wherein resolving an entity further comprises applying resolution rules requiring at least matching a plurality of features between respective instances of the entity; determine a second degree connection between a first participating entity and the second participating entity, wherein the second degree connection includes a linking entity that is connected to each of the first participating entity and the second participating entity in at least one third database.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting second degree relationships between entities. More specifically, the disclosed embodiments allow for detecting second degree relationships between potential contact entities based on common entities involved in transactions. A request for second degree contacts related to a potential transaction is received. The request indicates at least a first participant entity to participate in a potential transaction as well as a subject entity that is the subject of the potential transaction. Based on first degree connections of the first participant entity, a linking entity is identified. The linking entity is a first degree connection of the first participant entity that is also connected to a second participant entity. The second participant entity is associated with the subject entity such that the second participant entity could participate in a desired transaction involving transfer of rights with respect to the subject entity.

As a non-limiting example of various entities, a first participant entity is a person named Amy seeking to buy a specific subject entity that is a real estate property of "Blackstone." In accordance with the disclosed embodiments, a linking entity is a person named Charles who is a first degree connection both to Amy and to Bob, the owner of Blackstone. Accordingly, by identifying the linking entity Charles, Amy can be directed to a person who can help facilitate a transaction involving buying a specific real estate property from Blackstone.

In an embodiment, identifying the linking entity includes resolving all relevant entities in multiple databases. More specifically, the databases include one or more subject entities database and one or more contacts database.

Each subject entities database stores data related to entities which may be the subject of transactions such as, but not limited to, transactions data, rent data, owner data, and the like. Such data may be utilized to uniquely identify a subject entity and to identify any people who may be authorized to engage in transactions involving the subject entity.

Each contacts database stores data related to connections between entities such as, but not limited to, connections via social networking sites or other data sources maintaining records of contacts between entities. As a result, data stored in the contacts database may be utilized to identify connections of entities.

In a further embodiment, resolving the entities includes applying resolution rules to each data of each entity. The resolution rules include rules for uniquely identifying an entity regardless of original format. Accordingly, the disclosed embodiments provide a rules-based system for resolving entities to be used in identifying second degree connections.

In this regard, it has been identified that, when looking to purchase real estate or make a similar transaction, a potential buyer will often seek out a connection to the owner of the real estate in order to facilitate the transaction. If the owner is not an immediate contact, any indirect connection to the owner may be unclear. It has been identified that the large number of contacts accumulated over social media and other networking sites can be leveraged in order to identify these non-obvious connections. However, manually attempting to look through each first degree connection's contacts list is unfeasible and requires subjective judgments on whether information related to a particular property matches the desired real estate.

Specifically, data related to transactions and contacts may be stored in different formats which can cause information such as address, description, or other features of the same property to appear differently in different databases. More specifically, in real estate, there are no globally unique identifiers used for properties in different databases. Manually evaluating whether two data entries representing properties in fact represent the same underlying property therefore often requires a subjective evaluation of whether the data entries are "close enough." This results in inconsistent identification of linking entities and, in particular, false negatives (i.e., failing to identify a valid linking entity for the desired real estate). The disclosed embodiments provide a rules-based approach which considers various data points in order to uniquely identify entities regardless of particular formatting, thereby allowing for an objective analysis which improves consistency and accuracy of results.

Figure 1:
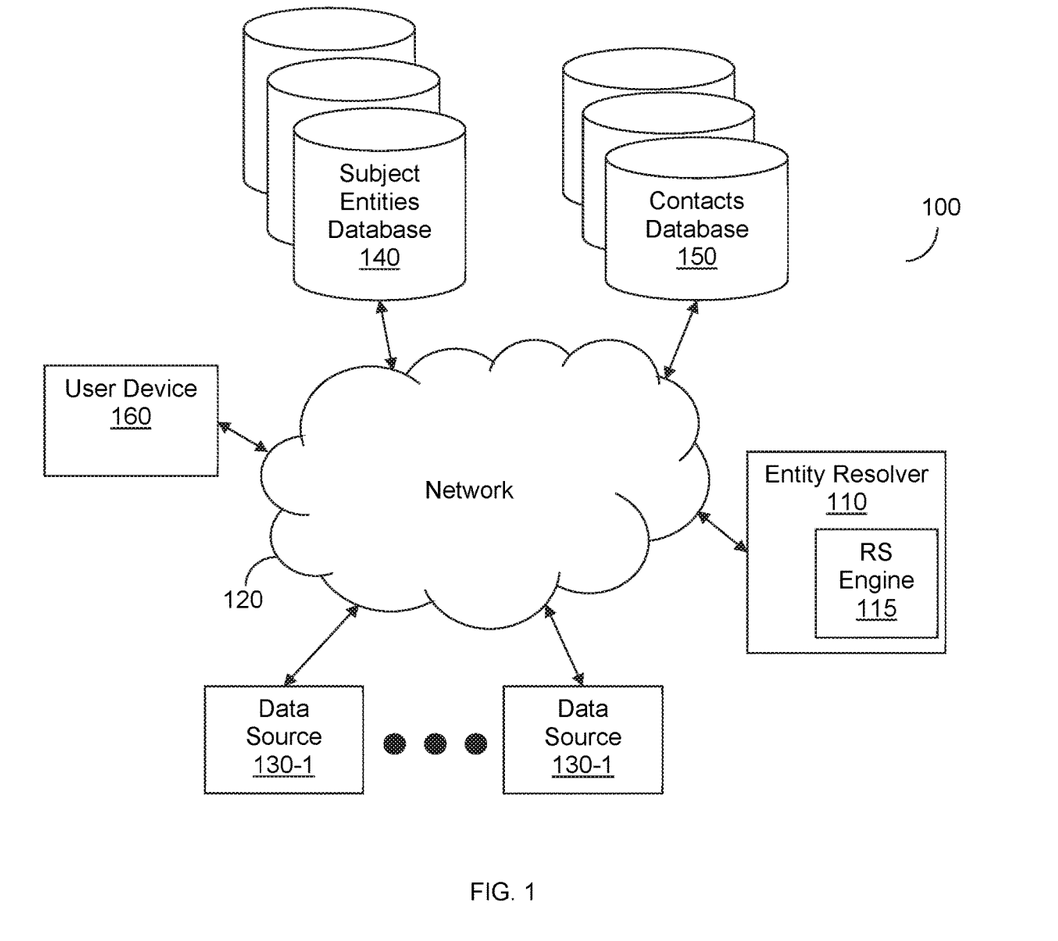
FIG. 1 is a network diagram utilized to describe the various embodiments.

FIG. 1 shows an example network diagram 100 utilized to describe the various disclosed embodiments. In the example network diagram 100, an entity resolver 110, data sources 130-1 through 130-N (where N is an integer having a value of 1 or greater), one or more subject entities databases 140, one or more contacts databases 150, and a user device 160 communicate via a network 120. The network 120 may be, but is not limited to, a wireless, cellular or wired network, a local area network (LAN), a wide area network (WAN), a metro area network (MAN), the Internet, the worldwide web (WWW), similar networks, and any combination thereof.

The data sources 130-1 through 130-N (hereinafter referred to as a data source 130 or as data sources 130 for simplicity) store data about potential subject entities for whom transactions may be desired. The data sources 130 may be, but are not limited to, public or private websites such as websites of real estate listings. The data sources 130 may store data relevant to a potential buyer such as, but not limited to, location, size, number of rooms, number of bathrooms, floors, images, owner, property manager, occupancy, effective rent per unit, latest price indication, year built, combinations thereof, and the like.

A user of the user device 160 may send, to the entity resolver 110, a request to find a suitable subject entity and to identify a connection for the suitable subject entity. In an embodiment, the entity resolver 110 is configured to search the data sources 130 for a suitable subject entity and, upon finding the suitable subject entity (e.g., a given property), determine whether there is a first degree connection of the user related to the suitable subject entity. The user device 160 may be, but is not limited to, a personal computer, a laptop, a tablet computer, a smartphone, a wearable computing device, or any other device capable of receiving and displaying data received from the data sources 130.

The request may include one or more requirements for a suitable subject entity such as, but not limited to, price (e.g., a price range, a maximum price, etc.), location (e.g., a particular city, zip code, etc.), space requirements (e.g., a range of acceptable sizes, a minimum number of rooms, etc.), combinations thereof, and the like. The entity resolver 110 may be configured to search for subject entities in the data sources 130 and to identify all subject entities meeting these requirements as suitable subject entities. In an example implementation, the entity resolver 110 provides the suitable subject entities to the user device 160 (e.g., in the form of a notification or update to a graphical user interface), and the user of the user device 160 may select a desired subject entity for which the entity resolver 110 should identify any appropriate connections (e.g., first degree connections, second degree connections, etc.).

The entity resolver 110 is further configured to extract data relevant to uniquely identify the desired subject entity as well as data indicating an owner of the desired subject entity. The uniquely identifying data may include, but is not limited to, name, address, location, size, occupancy features (e.g., potential number of occupants, number of bedrooms, etc.), combinations thereof, and the like. The data indicating the owner of the desired subject entity includes at least a name of the person or company who owns the desired subject entity.

In an example implementation, the entity resolver 110 is configured to search for a first degree connection between a representative of the owner of the desired subject entity and the user. A list of contacts of the user may be stored in a searchable database (e.g., the contacts database 150). As a non-limiting example, the user may have 1,000 people as contacts on a social media platform, and a person who owns a real estate property ""Avia Riverside" is identified as a first degree connection. As another non-limiting example, the contacts database 160 may store a list of employees of the company including representatives of the company typically directly authorized to engage in transactions involving company property (e.g., a Chief Executive Officer, a Chief Financial Officer, a financial analyst, and the like).

When the owner of the desired subject entity is a person, searching for the first degree connection may include searching for a contact of the user who is the current owner. To this end, the entity resolver 110 is configured to extract data related to a most recent transaction involving the desired subject entity from one or more of the subject entities databases 140 and to determine whether the recipient of that transaction is a connection of the user. More specifically, data may be extracted from a transactions database among the subject entities databases 140. Such a transactions database stores data related to entities involved in transactions of subject entities such as, but not limited to, buyer, seller, buyer broker, seller broker, lender, and the like. Such entities involved in transactions may be persons or companies. The transactions database may further store additional data of the entities such as, but not limited to, transaction history between any two entities that have engaged in transactions with each other.

In addition, the subject entities databases 140 may further store data indicating the relation or relations between entities or their representatives, such as, transactions history between the two entities. Thus, a connection between a user and a representative of a linking company having a direct connection with a representative of an owner company may be detected. As a non-limiting example, the entity resolver 110 identifies a linking entity by searching in the contacts database 150 in order to identify a CEO of a linking company who is a mutual acquaintance of both the user requesting a property "Avia Riverside" and an owner company who owns the property Avia Riverside. Additionally, relation data may be extracted. The relation data may be indicative of the type of relation between the linking entity and the owner entity. As a non-limiting example, the representative of a company XYZ Inc. may be the property manager of a different real estate property owned by ABC Ltd. which owns Avia Riverside.

When the owner of the desired subject entity is a company, searching for the first degree connection may further include identifying a person who is a representative or delegate of the company that is typically authorized to make decisions regarding property of the company (e.g., a Chief Executive Officer or Chief Financial Officer). As a non-limiting example, a list of 200 employees, delegates, or both, may be retrieved based on their job title indicating that they are all have been working at a company. The list of 200 employees, delegates, or both, may be compared to a list of contacts in order to determine whether the connection exists.

To this end, the data sources 130 may further include company websites or other data sources storing data about people who are associated with the company and the entity resolver 110 may be configured to search through those data sources related to the owner company. Alternatively or collectively, people who represent the company may be identified as contacts of the company in the contacts database 150 (e.g., people who are associated with a social media profile of the company via a social media website). The entity resolver 110 may be further configured to identify connections between companies (e.g., based on two companies being contacts of each other on social media or based on other company data indicating affiliates or associates of each company) and to identify a relevant representative of each company in order to allow for identifying potential connections between those representatives.

In an embodiment, if there is not a first degree connection of the user related to the suitable subject entity, the entity resolver 110 is configured to identify a second degree connection for the user that would help facilitate a transaction involving the suitable subject entity. As a non-limiting example, a Chief Executive Officer (CEO) of a first company that has a first-degree connection with both the Chief Financial Officer of a second company which owns the subject entity and with the user may be identified as a linking entity.

In an embodiment, the entity resolver 110 is configured to identify a linking entity that would be able to facilitate a transaction involving the desired subject entity. The linking entity therefore represents a second degree connection between the user and the owner or other person authorized to conduct transactions involving the desired subject entity. As a non-limiting example, the linking entity may be a person who is a friend of both the user and the owner on one or more social media platforms. As another non-limiting example, the linking entity may be an employee of a company that owns the desired subject entity who is also a contact of the user on a social media platform. As a further example, the linking entity may be one of 1,000 contacts of the user on a social media platform who has a direct connection to the chief financial officer (CFO) of the company that owns a real estate property such that the linking entity can introduce the user to the CFO of the owner company in order to facilitate a transaction.

To identify a linking entity that will facilitate a transaction involving the subject entity conducted between the user as a first participating entity and a second participating entity which owns the subject entity, the entity resolver 110 is configured to resolve potentially relevant entities in various locations including, but not limited to, the data sources 130, the subject entities databases 140, and the contacts databases 150. Once all potentially relevant entities have been resolved, the entity resolver 110 is configured to determine whether there are any indirect (e.g., second degree) connections between the first participating entity and the second participating entity.

At any or each stage of the process in which the entity resolver 110 encounters an entity which is relevant to identifying connections (e.g., when the entity resolver 110 analyzes data indicating a potential participating entity such as a buying entity or owner entity, subject entity, linking entity, representative entities, etc.), the entity resolver 110 is configured to resolve the entity as described further herein. In an embodiment, resolving an entity includes uniquely identifying the entity in different databases using resolution rules such that the entity is uniquely identified regardless of formatting of each database. The resolution rules provide rules accounting for multiple factors that collectively uniquely identify a particular entity, and different resolution rules may be utilized for different types of entities.

In particular, one set of resolution rules may be utilized to resolve entities that are persons or companies (e.g., participating entities, linking entities, etc.), and another set of resolution rules may be utilized to resolve entities that are property (e.g., subject entities such as real estate properties). Further, different resolution rules may be utilized for companies as compared to persons.

The resolution rules collectively define requirements for uniquely identifying the entity in different datasets and may include, but are not limited to, requirements for a number of matching features, specific features which are required to match (e.g., address number such as "123" for an address of "123 Fannie Road"), a combination thereof, and the like. The resolution rules may further include rules for determining whether features match.

The resolution rules for companies may further include rules for identifying common abbreviations for a company based on, for example, job descriptions provided by representatives of the company on social media. As a non-limiting example, a company "Alpha Beta Gamma Corp." may have a CEO whose job title as listed on social media is "CEO of ABG." In that example, "ABG" may be identified as a common abbreviation of "Alpha Beta Gamma Corp." such that appearance of "ABG" increases the likelihood that an entity is or is related to Alpha Beta Gamma Corp. Alternatively or collectively, the resolution rules may be based on a predetermined list of known abbreviations for companies.

Resolution rules for property entities may be based on, but are not limited to, address, current owner, previous buyers, previous sellers, brokers involved in transactions involving the property, lenders used to secure funding for transactions involving the property, property managers of the property, size (e.g., in square feet), number of rooms, ancillary features (e.g., pool, fence, etc.), cost (e.g., historical purchase prices, rent price, etc.), number of units, vintage, debt, latitude and longitude, and the like. Resolution rules for person entities may be based on, but are not limited to, name, home address, marital status, occupation, and the like. Resolution rules for company entities may be based on, but are not limited to, name, addresses of places of business, company management (e.g., owners, Chief Financial Officers, Chief Technical Officers, Chief Executive Officers, Chief Operating Officers, Presidents, Vice Presidents, etc.), and the like.

The resolution rules for company entities may further include rules for establishing that one company entity is a subsidiary of another company entity such that the companies are equivalent for purposes of establishing connections.

In an embodiment, by resolving an entity between different databases, the appearance of the entity in multiple data sources may be determined. To this end, each entity in data extracted from a database is resolved using the resolution rules such that it is uniquely identified, and resolved entities are compared among databases in order to identify each instance of each entity in each database. In a further embodiment, different databases may be linked when the entities in each have been resolved. As a non-limiting example, a joint database (not shown) may be created based on a subject entities database 140 and a contacts database 150 by performing a join operation between the databases and storing a table mapping different appearances of entities in the different databases to their respective unique resolved entities.

In an embodiment, based on the extracted relation data, the entity resolver 110 is configured to generate a dashboard that includes the results of the search for a first or second degree connection. Such results may further include, but are not limited to, an identity of the owner entity of the desired subject entity, an identity of the linking entity who can facilitate a transaction involving the desired subject entity, representatives (if applicable) of any entities which are companies, and the like.

In an embodiment, the entity resolver 110 is further configured to generate a graph database including a graph illustrating connections among the entities relevant to engaging in a transaction involving the desired subject entity (e.g., the requesting user entity, the owner entity, the linking entity, any representatives of other entities, etc.). The graph may be provided to the user of the user device 160 via the dashboard, thereby providing the user with a visual illustration of any second degree connections.

In an embodiment, the entity resolver 110 may be further configured to generate one or more relation scores as described herein below with respect to FIG. 4. Each relation score is a ranking that indicates the level of the relation or the quality of the relation based on one or more predetermined relation rules or parameters. To this end, in a further embodiment, the entity resolver 110 may be further configured with a relation score (RS) engine 115 configured to determine relation scores as described herein.

It should be noted various descriptions of FIG. 1 refer to a subject entities database 140 and a contacts database 150 merely for simplicity purposes, but that the disclosed embodiments may equally utilize data stored in multiple subject entities databases, multiple contacts databases, or both. As one particular example for using multiple contacts databases, a first contacts database may store contacts from a first social media platform that the user belongs to, and a second contacts database may store contacts from a second social media platform that the owner of the desired subject entity belongs to. In such an implementation, the disclosed embodiments allow for using data from these disparate social media platforms, which may store data related to contacts in different formats or may store slightly different data for a particular contact (e.g., a nickname versus a full name), in order to find second degree connections which would otherwise not be obvious to a user of only one social media platform or would require making subjective assumptions about the identities of users in the different social media platforms.

Figure 2:
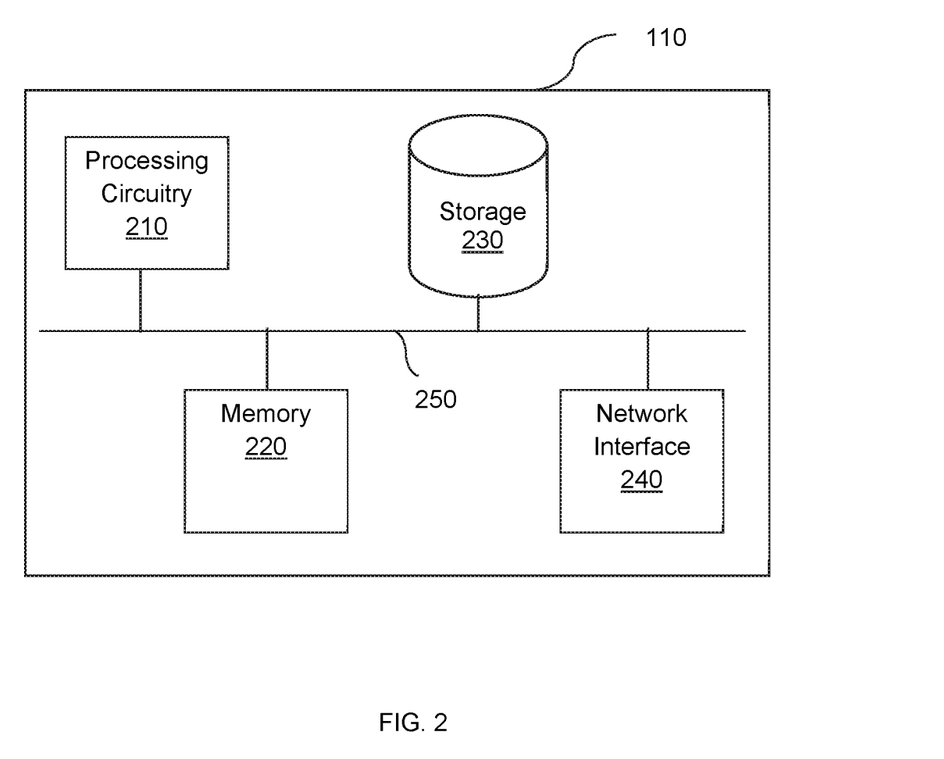
FIG. 2 is a block diagram of an entity resolver according to an embodiment.

FIG. 2 is an example schematic diagram of an entity resolver 110 according to an embodiment. The entity resolver 110 includes a processing circuitry 210 coupled to a memory 220, a storage 230, and a network interface 240. In an embodiment, the components of the entity resolver 110 may be communicatively connected via a bus 450.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 220 may be volatile (e.g., random access memory, etc.), non-volatile (e.g., read only memory, flash memory, etc.), or a combination thereof.

In one configuration, software for implementing one or more embodiments disclosed herein may be stored in the storage 230. In another configuration, the memory 220 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, cause the processing circuitry 210 to perform the various processes described herein.

The storage 230 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 240 allows the entity resolver 110 to communicate with, for example, the data sources 130, the subject entities databases 140, the contacts databases 150, and the like.

It should be understood that the embodiments described herein are not limited to the specific architecture illustrated in FIG. 2, and other architectures may be equally used without departing from the scope of the disclosed embodiments.

Figure 3:
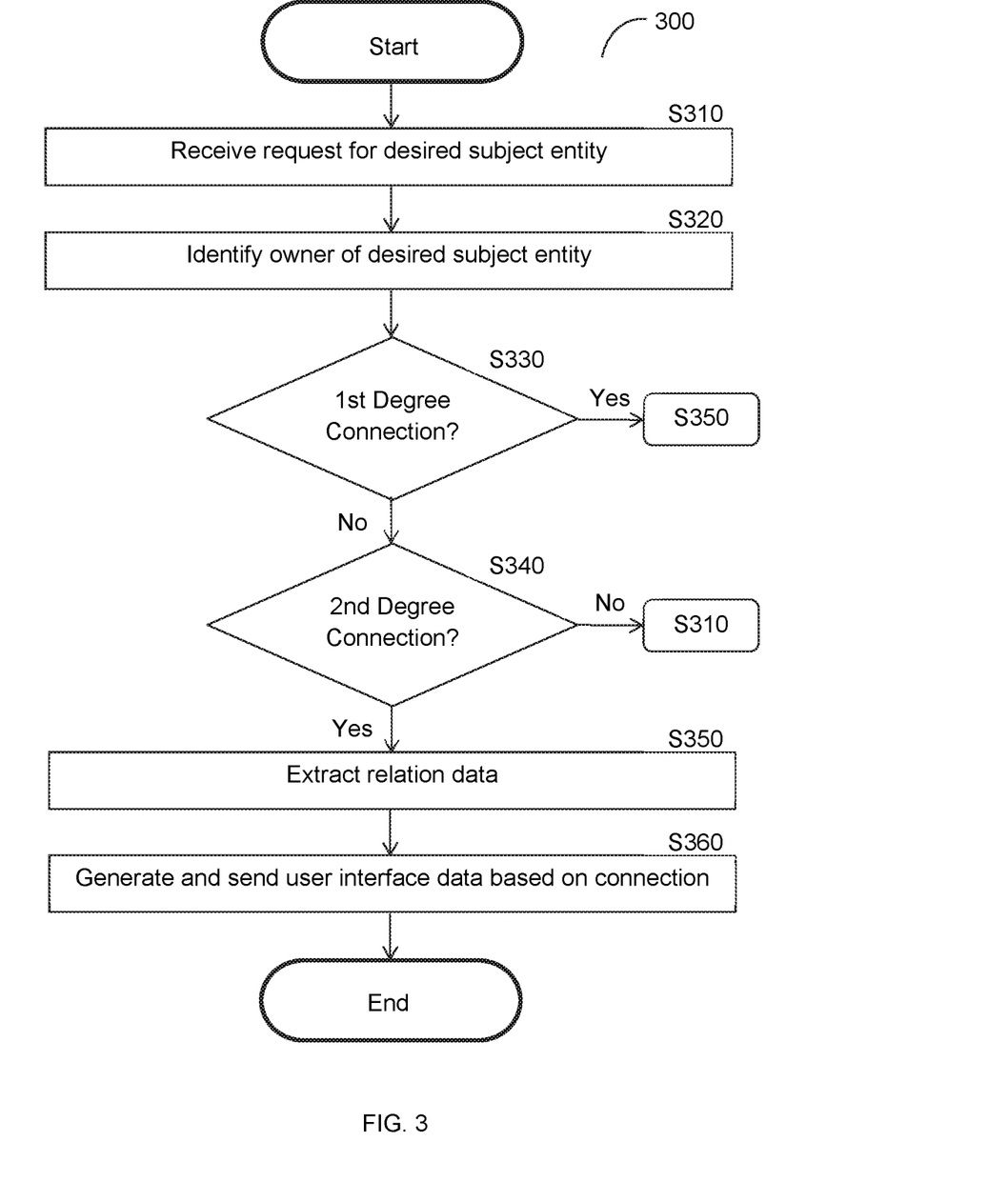
FIG. 3 is a flowchart illustrating a method for identifying second degree connections between entities in databases according to an embodiment.

FIG. 3 is a flowchart 300 illustrating a method for identifying second degree connections between entities in databases according to an embodiment. In an embodiment, the method is performed by the entity resolver 110, FIG. 1.

At S310, a request for connections to a desired subject entity is received from a user. The desired subject entity is a property or other entity which the user would like to purchase, rent, or otherwise engage in a transaction regarding. As a non-limiting example, the desired subject entity may be a real estate property the user wishes to purchase. Thus, the user will act as a first participating entity in a transaction involving the desired subject entity. To help facilitate the transaction, any connections of the user who are or are connected to the owner of the desired subject entity are to be identified.

In an embodiment, the request includes an identification of the first participating entity (e.g., the user) and an identification of the desired subject entity.

At S320, an owner of the desired subject entity who may act as the second participating entity in a transaction involving the desired subject entity is identified.

In an embodiment, S320 includes resolving the desired subject entity. In a further embodiment, such entity resolution is performed as described further herein below with respect to FIG. 5. More specifically, an instance of the desired subject entity in a first database (e.g., a database storing real estate listings) may be compared to data stored in a transactions database to identify the desired subject entity in the transactions database, thereby uniquely identifying the desired subject entity in both of the databases. An entry in the transactions database indicating the most recent transaction involving the desired subject entity is analyzed to identify the current owner of the desired subject entity as the most recent buyer of the desired subject entity.

At S330, it is determined whether a first degree connection exists between the user and the owner of the desired subject entity and, if so, execution continues with S350; otherwise, execution continues with S340. In an embodiment, S330 includes accessing one or more contacts databases (e.g., the contact databases 150, FIG. 1) storing contacts data for the user.

In a further embodiment, S330 may include resolving the owner entity as indicated in a subject entity database with entities indicated in the contacts databases storing the contacts data for the user. The entity resolution may be performed as described further below with respect to FIG. 5.

At S340, it is determined whether a second degree connection exists between the user and the owner of the desired subject entity and, if so, execution continues with S350; otherwise, execution may continue with S310 where the user is prompted to select another desired subject entity. Alternatively, when a second degree connection cannot be found, a notification indicating as much may be generated and sent to, for example, a user device (e.g., the user device 160).

The second degree connection involves a linking entity that indirectly connects the user to the owner. As a non-limiting example, the linking entity may be a friend of both the user and the owner on social media. The linking entity may be a friend of the user on one social media platform and a friend of the owner on another social media platform, or may be connected via the same social media platform. Such friendships or other contacts are indicated in one or more contacts databases. When identifying the second degree connection requires extracting data from multiple contacts databases, S340 further includes resolving entities among those contacts databases. As a non-limiting example, data indicating contacts of the owner and data indicating contacts of the user may need to be resolved to identify the linking entity in the multiple contacts databases in order to identify that the same entity is a contact of both the user and the owner.

At S350, relation data indicating the relationship between the user and the owner of the desired subject entity is extracted. The relation data may include, but is not limited to, data identifying each entity connecting the user to the owner, data indicating that a person entity is a representative of a company entity, data indicating the nature of the relationship between entities (e.g., person A is CEO of XYZ company, person A is a friend of person B on social media, etc.), combinations thereof, and the like.

At optional S360, user interface data demonstrating the connection between the user and the owner of the desired subject entity is generated and sent to a user device of the user (e.g., the user device 160, FIG. 1). The generated user interface data, when integrated into a user interface, may illustrate information such as, but not limited to, whether the connection is a first degree connection or a second degree connection, the owner entity, a linking entity for the owner entity, a position within a company of each representative of the company, a combination thereof, and the like.

As a non-limiting example, a request for a desired subject entity "Avia Riverside" is received from a user Alice who wishes to be a first participating entity in a transaction involving renting Avia Riverside. The request includes an identification of Avia Riverside from a rental listing database listing its address as "123 Fannie Road, Roswell, Atlanta." The entity Avia Riverside is resolved between the rental listing database and one or more real estate transactions databases. The instance of Avia Riverside in the rental listing database is resolved to an instance of Avia Riverside in one of the real estate transactions databases listing its address as "125 Fannie Rd., Roswell, Atlanta." The resolution is performed despite the difference in address due to resolution rules for treating common abbreviations as the same and due to analyzing various features other than address (e.g., latitude and longitude, number of units, etc.). The listing of Avia Riverside in the real estate transaction database further indicates that a company entity LandOwners LLC currently owns Avia Riverside because it is the most recent buyer of Avia Riverside.

According to the same example, the entity LandOwners LLC is resolved between the real estate transactions database and a first contacts database including data indicating connections between companies. The instance of LandOwners LLC in the real estate transactions database is resolved to an instance in the contacts database which indicates that LandOwners LLC is a subsidiary of Blackstone. The entities LandOwners LLC and Blackstone are resolved between the first contacts database and a second contacts database indicating representatives of companies. The resolution results in identifying various representatives of LandOwners LLC and Blackstone. Finally, the identified representatives are resolved with contacts of the user Alice in a third contacts database storing social media connections data.

According to the same example, the resolution results in identifying that one of Alice's connections on social media, Bob, is connected to the CEO of Blackstone, Charles. Thus, a second degree connection between Alice and LandOwners LLC is identified via Bob. Relation data indicating the relationships between Alice and Bob as well as between Bob and Charles is extracted for use in a user interface. Accordingly, data indicating the second degree connection via Bob may be provided to Alice, thereby allowing Alice to make an introduction or otherwise facilitate the transaction via Bob.

Figure 4:
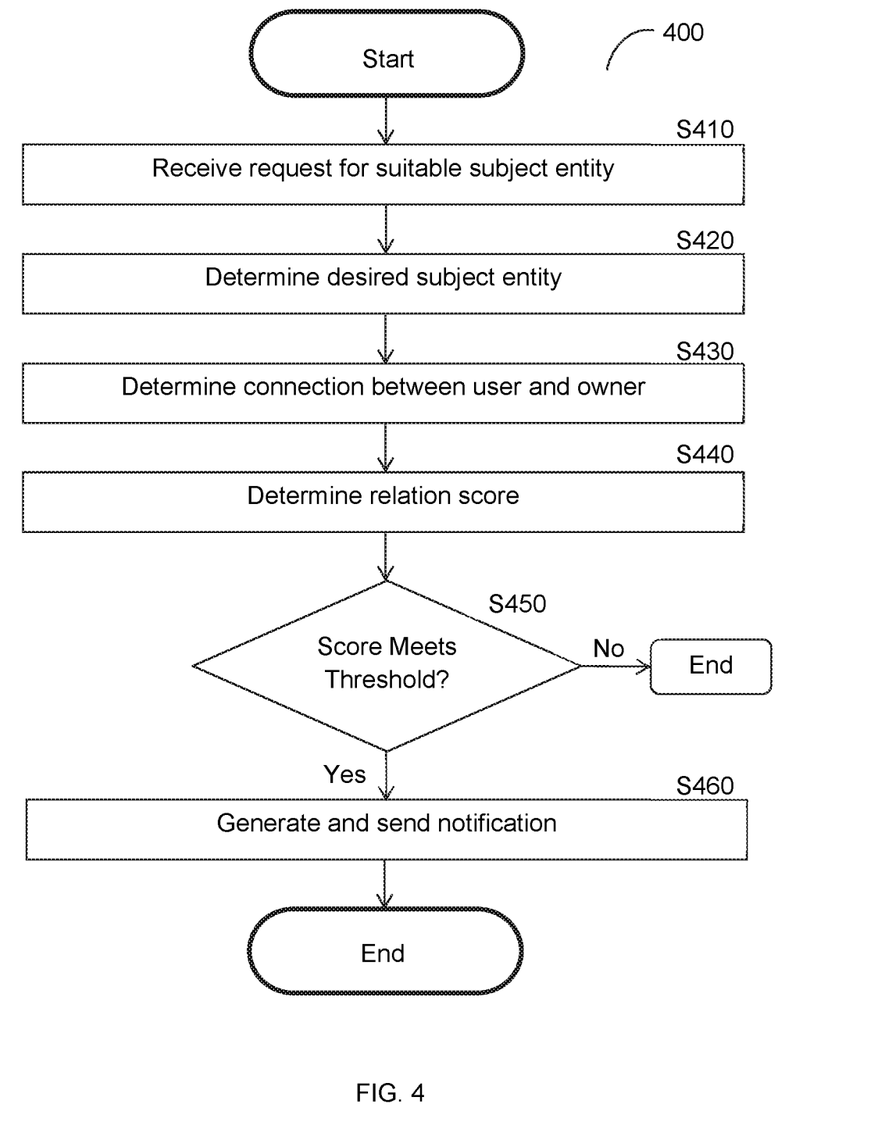
FIG. 4 is a flowchart illustrating a method for identifying sufficiently related second degree connections between entities in databases according to an embodiment.

FIG. 4 is a flowchart illustrating a method for identifying sufficiently related second degree connections between entities in databases according to an embodiment. In an embodiment, the method is performed by the entity resolver 110, FIG. 1.

At S410, a request for a suitable subject entity is received from a user (e.g., via the user device 160, FIG. 1). The request at least indicates one or more requirements for the suitable subject entity. Such requirements may include, but are not limited to, for rent or for purchase, a maximum price, a price range, rent cost, number of rooms, number of bedrooms, number of bathrooms, number of floors, geographic location (e.g., a zip code, city, etc.), combinations thereof, and the like.

At S420, one or more subject entity data sources are searched for one or more suitable subject entities which meet the requirements from the user. The subject entity data sources searched at S420 may include, but are not limited to, real estate listings databases, rental databases, and the like. In an embodiment, S420 further includes sending a notification indicating the suitable subject entities to the user and receiving a selection of a suitable subject entity that is desired.

At S430, a connection between the requesting user and an owner of a desired subject entity is determined. In an embodiment, such a connection may be a first degree connection or a second degree connection determined as described herein above with respect to FIG. 3.

At S440, a relation score is determined based on the connection between the requesting user and the owner of the desired subject entity.

In an embodiment, the relation score is determined based on whether the connection is a first degree connection or a second degree connection as well as the type of relationship between the owner and a linking entity for a second degree connection. To this end, the highest relation score may be determined when the user has a first degree connection to the owner or to a representative of an owner company. Lower relation scores may be determined when the user has a second degree connection to the owner or to a representative of the owner company, and further lower relation scores may be determined when the relationship between the linking entity and the owner entity is less intense. Intensity of relationships may be predetermined.

As a non-limiting example for relation scoring, a relation score of "1" may be the highest possible score and may be determined when the requesting user has a first-degree connection with the CEO of the company that owns the property, a relation score of "2" may be determined when the requesting user has a direct connection with a CFO of a second entity (e.g., a company) that is connected to a first entity (e.g., other company) that owns the property, a relation score of "3" may be determined when the requesting user has a direct connection to a representative of second entity (e.g., a company) that previously sold the subject entity to a first entity (e.g., other company) that now owns the property, and a relation score of "4" may be determined when the requesting user has a direct connection to a representative of a property management company that managers the subject entity. Further delineations of scores may be equally utilized without departing from the disclosed embodiments.

At S450, it is determined whether the relation score at least meets a predetermined threshold and, if so, execution continues with S460; otherwise, execution terminates. As a non-limiting example, for the example relation scores above, a relation score of 3 or higher may be required (i.e., a relation score of 1, 2, or 3) such that a second degree connection via a property management company is deemed insufficient to notify the user. Applying such a threshold allows for removing results that are unlikely to actually help facilitate a transaction, thereby improving the user experience by reducing irrelevant results.

At S460, when it is determined whether the relation score at least meets the threshold, a notification is generated and sent to the user. The notification may indicate, but is not limited to, whether the connection is a first degree connection or a second degree connection, the owner entity, a linking entity for the owner entity, a position within a company of each representative of the company, a combination thereof, and the like.

Figure 5:
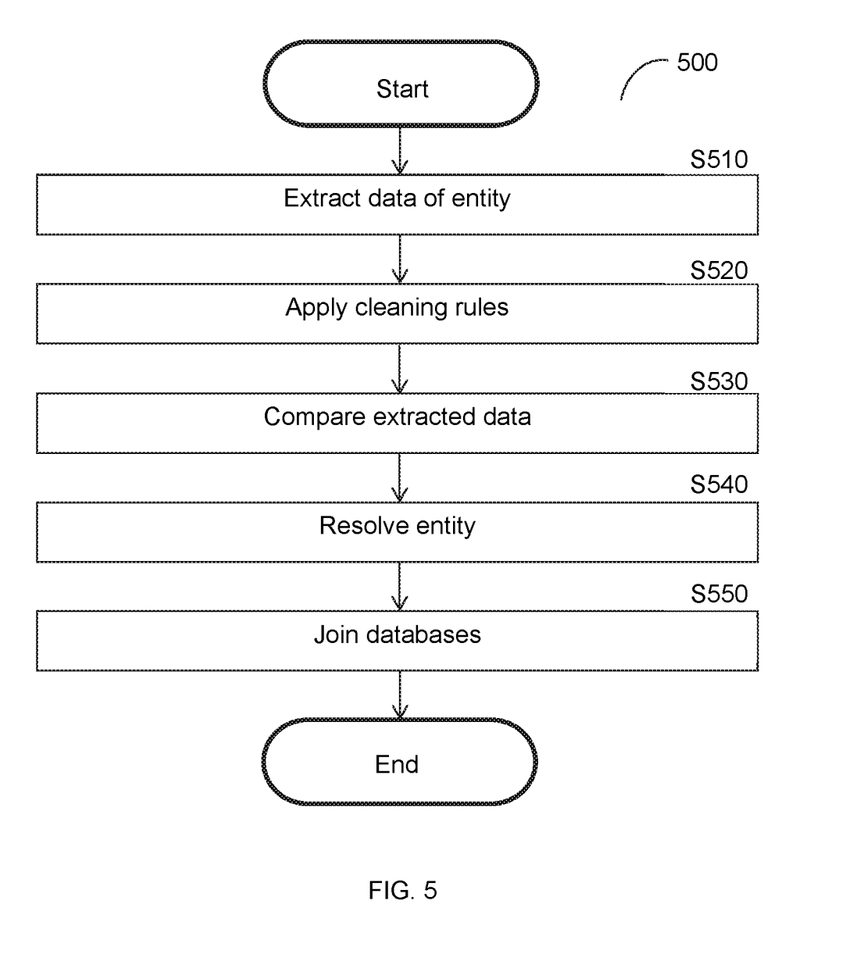
FIG. 5 is a flowchart illustrating a method for resolving entities according to an embodiment.

FIG. 5 is a flowchart 500 illustrating a method for resolving entities according to an embodiment. In an embodiment, the method is performed by the entity resolver 110, FIG. 1.

At S510, data related to the entity is extracted from a first database. More specifically, the extracted data includes data that is relevant to uniquely identifying the entity. The uniquely identifying data may include, but is not limited to, name, address, location, size, occupancy features (e.g., potential number of occupants, number of bedrooms, etc.), combinations thereof, and the like.

At S520, resolution rules for cleaning the extracted data are applied. Such cleaning resolution rules may include, but are not limited to, rules for removing common postfixes, rules for cleaning text (e.g., stripping spaces from text, converting uppercase to lowercase, etc.), rules for removing honorifics or titles from names, rules for removing common postfixes (e.g., "LLC," "Ltd.," "Inc.," etc.), combinations thereof, and the like. Such cleaning resolution rules provide rules for determining whether features which otherwise do not match reflect the same underlying features.

At S530, the extracted data is compared to data related to one or more entities indicated in a second database. In an embodiment, S530 may include identifying matching features between the instance of the entity in the first database and the data in the second database.

At S540, the entity is resolved based on the comparison. In an embodiment, resolving the entity includes identifying any instances of the entity in the second database. The entity resolution is performed using resolution rules that collectively define whether two instances of data representing entities effectively represent the same uniquely identified entity. The resolution rules provide rules accounting for multiple factors that collectively uniquely identify a particular entity, and different resolution rules may be utilized for different types of entities. To this end, in an embodiment, S540 may include determining a type of entity to be resolved and applying appropriate resolution rules for that type of entity.

The resolution rules collectively define requirements for uniquely identifying the entity in different datasets and may include, but are not limited to, requirements for a number of matching features. More specifically, the resolution rules require matching between multiple features included in different instances of entities in order to identify those instances as representing the same underlying entity. Each instance of an entity may be an entry in a database or other data source indicating information that may be related to an entity. In an embodiment, S540 includes applying such resolution rules to determine whether instances of entities in the first and second databases represent the same underlying entity.

By using resolution rules requiring multiple matching features, an entity can be uniquely identified as existing in different databases despite any differences in format or specific features. As a non-limiting example, rather than solely relying on address to identify an entity, multiple features including number of units, vintage, latitude and longitude, and the like, may be utilized to determine whether two instances of entities represent the same entity. Further, by cleaning the data as noted above with respect to S520, individual features are more likely to be matched accurately despite common differences in formatting.

In this regard, it is noted that manual resolution of entities in databases is infeasible due to the sheer volume of entries. Regardless, manual resolution of entities requires subjective evaluations regarding entity similarity as expressed in different databases. As a result, different human observers may come to different conclusions as to whether different instances of entities represent the same underlying entity. More specifically, such manual resolution of entities may involve subjectively determining whether names, addresses, or descriptions of entities "feel" sufficiently similar, which may cause some human observers to determine that two instances of entities represent the same underlying entity while other human observers determine that the instances represent different underlying entities. The resolution rules provide an objective set of rules which provide consistent and accurate results as compared to manual entity resolution.

It has further been identified that, aside from formatting differences, data related to an entity may include minor errors which may have a significant impact on whether the data "appears" to represent the same entity from the perspective of a manual observer. For example, one instance of an entity may mistakenly indicate an address of "123 ABC Street" when the address of the actual entity is "125 ABC Street." A human observer may or may not recognize that these instances represent the same underlying real estate property. The resolution rules, which utilize multiple rules defining minimum requirements for matching entities, provide a mechanism for uniquely identifying an entity regardless of such mistakes or other differences.

The resolution rules may further include rules for determining whether specific features of entities match such as, but not limited to, rules defining abbreviations, rules defining synonyms, rules defining partial matches, and the like. As a non-limiting example, an address may appear in one database as "123 Fannie Road" and in another database as "123 Fannie Rd," and the resolution rules may define "Rd" as an abbreviation of "Road" such that these entries would match. As another non-limiting example, resolution rules defining partial matches may indicate that an address partially matches if either the number of the address (e.g., "123") or the named portion of the address (e.g., "Fannie Road") matches but the other does not match.

At optional S550, the databases sharing the resolved entity are joined. In an embodiment, S550 includes performing a JOIN operation between the databases. In a further embodiment, S550 further includes storing or updating a table mapping instances of the entity to each other such that the instances are effectively marked as being instances of the same entity.

It should be noted that the disclosed embodiments are described with respect to identifying second degree connections merely for simplicity purposes, but the disclosed embodiments may be equally applicable to identifying third or more degree connections. As a non-limiting example, a third degree connection between a user Alice and a property owner Dave may include intermediate connections Bob and Charles, where Bob is a contact of Alice, Charles is a contact of Bob, and Dave is a contact of Charles. Each relevant entity (i.e., Alice, Bob, Charles, Dave, and the property) is resolved, i.e., uniquely identified using the objective rules-based mechanism described herein, such that second or higher degree connections may be discovered among any number of different contacts databases.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for identifying second degree connections between entities represented in different databases, comprising:
    identifying a second participating entity that owns a subject entity, wherein identifying the second participating entity further comprises resolving the subject entity between a first database and a second database, wherein the subject entity is resolved such that respective instances of the subject entity in the first database and the second database are determined as each uniquely identifying the same subject entity, wherein resolving an entity further comprises applying resolution rules requiring at least matching a plurality of features between respective instances of the entity; and
    determining a second degree connection between a first participating entity and the second participating entity, wherein the second degree connection includes a linking entity that is connected to each of the first participating entity and the second participating entity in at least one third database.

2. The method of claim 1, wherein the at least one third database includes a contacts database indicating contacts of the first participating entity and a contacts database indicating contacts of the second participating entity, wherein determining the second degree connection further comprises:
    identifying a plurality of contacts of the second participating entity in the at least one third database, wherein each of the plurality of contacts of the second participating entity is a potential linking entity; and
    resolving each of the plurality of potential linking entities between the contacts database indicating contacts of the first participating entity and the contacts database indicating contacts of the second participating entity, wherein the linking entity is one of the plurality of potential linking entities that is uniquely identified as a contact of both the first participating entity and the second participating entity.

3. The method of claim 1, wherein the second degree connection is determined when a first degree connection between the first participating entity and the second participating entity does not exist.

4. The method of claim 1, wherein the resolution rules include cleaning resolution rules for cleaning data related to an entity.

5. The method of claim 4, wherein the cleaning resolution rules include rules for removing predetermined postfixes.

6. The method of claim 1, wherein the resolution rules include at least one of: rules defining abbreviations, and rules defining synonyms.

7. The method of claim 1, wherein the resolution rules include at least one of: requirements for a minimum number of matching features.

8. The method of claim 1, further comprising:
    determining the subject entity, wherein determining the subject entity further comprises searching for at least one suitable subject entity in at least one data source based on at least one requirement indicated in inputs from the first participating entity, wherein the determined subject entity is selected from among the at least one suitable subject entity.

9. The method of claim 1, further comprising:
    determining a relation score for the second degree connection between the first participating entity and the second participating entity;
    determining whether the relation score at least meets a threshold; and
    sending a notification indicating the second degree connection between the first participating entity and the second participating entity when it is determined that the relation score at least meets the threshold.

10. A non-transitory computer readable medium having stored thereon instructions for causing a processing circuitry to execute a process, the process comprising:
    identifying a second participating entity that owns a subject entity, wherein identifying the second participating entity further comprises resolving the subject entity between a first database and a second database, wherein the subject entity is resolved such that respective instances of the subject entity in the first database and the second database are determined as each uniquely identifying the same subject entity, wherein resolving an entity further comprises applying resolution rules requiring at least matching a plurality of features between respective instances of the entity; and determining a second degree connection between a first participating entity and the second participating entity, wherein the second degree connection includes a linking entity that is connected to each of the first participating entity and the second participating entity in at least one third database.

11. A system for identifying second degree connections between entities represented in different databases, comprising:

a processing circuitry; and a memory, the memory containing instructions that, when executed by the processing circuitry, configure the system to:

identify a second participating entity that owns a subject entity, wherein identifying the second participating entity further comprises resolving the subject entity between a first database and a second database, wherein the subject entity is resolved such that respective instances of the subject entity in the first database and the second database are determined as each uniquely identifying the same subject entity, wherein resolving an entity further comprises applying resolution rules requiring at least matching a plurality of features between respective instances of the entity; and determine a second degree connection between a first participating entity and the second participating entity, wherein the second degree connection includes a linking entity that is connected to each of the first participating entity and the second participating entity in at least one third database.

12. The system of claim 11, wherein the at least one third database includes a contacts database indicating contacts of the first participating entity and a contacts database indicating contacts of the second participating entity, wherein the system is further configured to:

identify a plurality of contacts of the second participating entity in the at least one third database, wherein each of the plurality of contacts of the second participating entity is a potential linking entity; and resolve each of the plurality of potential linking entities between the contacts database indicating contacts of the first participating entity and the contacts database indicating contacts of the second participating entity, wherein the linking entity is one of the plurality of potential linking entities that is uniquely identified as a contact of both the first participating entity and the second participating entity.

13. The system of claim 11, wherein the second degree connection is determined when a first degree connection between the first participating entity and the second participating entity does not exist.

14. The system of claim 11, wherein the resolution rules include cleaning resolution rules for cleaning data related to an entity.

15. The system of claim 14, wherein the cleaning resolution rules include rules for removing predetermined postfixes.

16. The system of claim 11, wherein the resolution rules include at least one of: rules defining abbreviations, and rules defining synonyms.

17. The system of claim 11, wherein the resolution rules include at least one of: requirements for a minimum number of matching features.

18. The system of claim 11, wherein the system is further configured to:

determine the subject entity, wherein determining the subject entity further comprises searching for at least one suitable subject entity in at least one data source based on at least one requirement indicated in inputs from the first participating entity, wherein the determined subject entity is selected from among the at least one suitable subject entity.

19. The system of claim 11, wherein the system is further configured to:

determine a relation score for the second degree connection between the first participating entity and the second participating entity;

determine whether the relation score at least meets a threshold; and send a notification indicating the second degree connection between the first participating entity and the second participating entity when it is determined that the relation score at least meets the threshold.

* * * * *